(12) United States Patent
Lee

(10) Patent No.: US 6,847,127 B1
(45) Date of Patent: Jan. 25, 2005

(54) SYSTEM AND METHOD FOR CONTROLLING POWER DISTRIBUTION OF FUEL CELL HYBRID ELECTRIC VEHICLE

(75) Inventor: Young-Kook Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 113 days.

(21) Appl. No.: 10/331,229

(22) Filed: Dec. 30, 2002

(30) Foreign Application Priority Data

Jun. 28, 2002 (KR) .................................. 2002-0037098

(51) Int. Cl.⁷ .............................. F02N 11/06; H02P 9/04
(52) U.S. Cl. .................................................. 290/40 C
(58) Field of Search .......................... 290/40 C, 40 B; 180/65.2, 65.4, 65.5; 429/9, 23, 13

(56) References Cited

U.S. PATENT DOCUMENTS

| | | | |
|---|---|---|---|
| 5,334,463 A | * | 8/1994 | Tajima et al. .................. 429/9 |
| 6,255,008 B1 | * | 7/2001 | Iwase ............................ 429/9 |
| 6,380,638 B1 | * | 4/2002 | Bitsche et al. ............ 290/40 C |
| 6,624,529 B2 | * | 9/2003 | Obayashi ................. 290/40 C |
| 6,672,415 B1 | * | 1/2004 | Tabata ....................... 180/65.2 |
| 2002/0039732 A1 | * | 4/2002 | Sugiura et al. ............ 180/65.2 |
| 2002/0064697 A1 | * | 5/2002 | Sugiura et al. ............... 429/23 |
| 2003/0066695 A1 | * | 4/2003 | Beckerman et al. ....... 180/65.2 |

FOREIGN PATENT DOCUMENTS

JP 2002-134125 10/2002

* cited by examiner

Primary Examiner—Joe Waks
Assistant Examiner—Julio Gonzalez
(74) Attorney, Agent, or Firm—Morgan Lewis & Bockius LLP (57) ABSTRACT

The present invention relates to a system and method for controlling power distribution of a fuel cell hybrid electric vehicle. The system includes a fuel cell, a battery, a DC/DC converter connected to the battery for the input and output of power, an inverter connected to the DC/DC converter and fuel cell, a motor connected to the inverter, and a controller for estimating the required vehicle power. Further the present invention controls power transmission between the fuel cell, the battery, the DC/DC converter, and the inverter. The controller selectively performs control into one of a fuel cell mode, a battery discharge mode, a battery charge mode, and a regeneration mode.

15 Claims, 6 Drawing Sheets

SYSTEM AND METHOD FOR CONTROLLING POWER DISTRIBUTION OF FUEL CELL HYBRID ELECTRIC VEHICLE

FIELD OF THE INVENTION

The present invention relates to fuel cell hybrid electric vehicles, and more particularly, to control of power distribution in fuel cell hybrid electric vehicles.

BACKGROUND OF THE INVENTION

Traditionally, fuel cells operate on the premise that a material having activity such as hydrogen, which is found in, for example, LNG, LPG or methanol, is oxidized through an electrochemical reaction, releasing chemical energy, which is converted into electrical energy. Compared to conventional methods of generating electricity, fuel cells are efficient and emit almost no air pollutants. Therefore, fuel cells are considered a technology of the future. As a result, research is being performed on ways to apply fuel cells as an alternative power source for vehicles so that energy may be conserved and air pollution minimized, resulting in less of an impact on global warming.

However, in the case where only fuel cells are used as the power source for a vehicle, various problems result. First, although fuel cells are able to maintain optimal efficiency in a particular range of power density ($W/cm^2$), overall efficiency is lacking since the vehicle frequently falls out of this range of operation. Further, an electric motor that drives the fuel cell vehicle requires a higher direct current voltage in a high-speed range than when driving at low speeds. Since a characteristic of the fuel cells is an abrupt reduction in output voltage with an increase in output current, the fuel cells are unable to supply the high DC voltage required by the electric motor at high speeds. As a result, the high-speed performance of the motor deteriorates. In addition, fuel cells utilize a chemical reaction between hydrogen and oxygen to generate electrical energy. As a result, sufficient power is unable to be instantaneously supplied if there is an abrupt demand for power by the vehicle. Also, fuel cells have only the characteristic of outputting power, such that regenerative power, which is generated during braking of the drive motor of the vehicle, is unable to be absorbed. Hence, the efficient use of energy is limited.

To overcome the limitations of the output characteristics of fuel cells, a secondary energy source is used in combination with the fuel cells in an effort to compensate for these deficiencies. That is, a hybrid configuration is used.

The power system for a conventional fuel cell hybrid electric vehicle includes a fuel cell used as the main power source and a battery used as the auxiliary power source. A bi-directional DC/DC converter connected in parallel between the fuel cell and the battery, which supplies a stable voltage to a motor. This maintains a balance between different output voltages of the fuel cell and the battery and supplies a surplus voltage of the fuel cell and the regeneration energy as a charge voltage of the battery. An inverter connected to an output terminal of the bi-directional DC/DC converter and an output terminal of the fuel cell. The inverter also controls the operation of the motor by IGBT switching effected through PWM (pulse width modulation) control.

The DC/DC converter performs a buck operation, in which internal transistors undergo switching according to control signals applied from a processor such that power is transmitted from the high voltage source of the battery to the low voltage source of the fuel cell by the flow of current through diodes. The DC/DC converter also performs a boost operation, in which power is transmitted from the low voltage source of the fuel cell to the high voltage source of the battery.

In such a fuel cell hybrid electric vehicle that uses both a main energy source (fuel cell) and an auxiliary energy source (battery), a systematic and efficient method of distributing energy is needed between the two energy sources. However, in the conventional fuel cell hybrid electric vehicle, suitable power distribution between the two energy sources does not occur. There is an inefficient use of electric power, and energy required to drive the vehicle is unable to be supplied in a stable manner. Further, there are problems in recovering the regeneration energy, which is promoted as one of the main advantages of electric vehicles.

SUMMARY OF THE INVENTION

In a preferred embodiment of the present invention, a system for controlling power distribution of a fuel cell hybrid electric vehicle includes a fuel cell, a battery, a bi-directional DC/DC converter, an inverter, a motor, and a controller. The fuel cell is used as a main power source. The battery is used as an auxiliary power source. The bi-directional DC/DC converter is connected to the battery to allow for the input of power to and output from the battery. The inverter is electrically connected to the bi-directional DC/DC converter and the fuel cell. The motor is connected to the inverter and converts electrical energy into rotational mechanical energy for driving the vehicle. The controller estimates a required vehicle power, and controls power transmission between the fuel cell, the battery, the bi-directional DC/DC converter, and the inverter based on the estimated required vehicle power and status of the fuel cell and of the battery.

The controller, according to a presently required vehicle power and a battery charge state, selectively performs control into one of a plurality of modes including a fuel cell mode, in which the energy of the fuel cell is transmitted through the inverter to drive the motor. A battery discharge mode is also included in which energies of the fuel cell and the battery are simultaneously transmitted through the inverter to drive the motor. A battery charge mode, in which part of the energy output from the fuel cell is transmitted through the inverter to drive the motor, and another part of the energy output from the fuel cell is transmitted through the bi-directional DC/DC converter to charge the battery. A regeneration mode is also included, in which restored braking energy is transmitted through the bi-directional DC/DC converter to charge the battery.

It is preferable that the fuel cell mode is implemented when the required vehicle power is less than or equal to a predetermined power and a charge degree of the battery is greater than or equal to an upper limit value. The required vehicle power is preferably estimated based on the power presently used in the motor, a level of depression of an accelerator pedal, and a level of depression of a brake pedal.

Further, it is preferable that the battery discharge mode is implemented when the required vehicle power is greater than a predetermined level of power, and an amount of charge of the battery is greater than or equal to a predetermined lower limit value. The battery charge mode is preferably implemented when the required vehicle power is less than a predetermined level of power, and an amount of charge of the battery is less than an upper limit value. The regeneration mode is preferably selected when the required vehicle power is less than zero.

A method for controlling power distribution of a fuel cell hybrid electric vehicle according to a preferred embodiment of the present invention, in which the system includes a fuel cell used as a main power source, a battery used as an auxiliary power source, a bi-directional DC/DC converter electrically connected to the battery and the fuel cell, and a controller that controls power transmission between the fuel cell, the battery, and the bi-directional DC/DC converter, includes estimating a required vehicle power in a present state. The method further includes determining if the required vehicle power is less than zero and setting a fuel cell required output amount to zero if the required vehicle power is less than zero. Furthermore, the method includes establishing an output current of the bi-directional DC/DC converter such that the battery may be charged based on a charge state of the battery.

It is preferable that the required vehicle power is estimated using a power presently used in the motor, a level of depression of an accelerator pedal, and a level of depression of a brake pedal.

Charging the battery preferably includes determining if the battery is overcharged. Estimating a required battery charging amount if the battery is not over charged and establishing a regeneration energy maximum value of a motor as the battery charge required amount. Finally, charging the battery includes establishing an output current of the bi-directional DC/DC converter to allow for the charge of the battery by an amount equal to the calculated battery charge required amount. Also, charging of the battery preferably further includes controlling to Off a regeneration function of the motor if the battery is overcharged and setting the output current of the bi-directional DC/DC converter to zero.

In addition, the method preferably further includes determining if the required vehicle power is less than or equal to a predetermined power level if the estimated required vehicle power is not less than zero. Determining that the battery requires charging if the required vehicle power is less than or equal to the predetermined power level. Calculating a battery charge required amount and performing controls to charge the battery according to the calculated battery charge required amount.

The charging of the battery preferably includes calculating the battery charge required amount based on a present battery charge state. Determining if a difference between the predetermined power level and the required vehicle power is greater than the battery charge required amount and establishing the output current of the bi-directional DC/DC converter such that the battery may be charged by the calculated charge required amount if the difference between the predetermined power level and the required vehicle power is greater than the battery charge required amount.

It is preferable that the output current of the bi-directional DC/DC converter is established such that energy corresponding to the difference between the predetermined power and the required vehicle power is stored in the battery in the case where the difference between the predetermined power level and the required vehicle power is not greater than the battery charge required amount.

It is further preferable that the output current of the bi-directional DC/DC converter is set to zero such that the battery is not charged in the case where charging of the battery is not required.

The method also preferably includes determining that discharging of the battery is possible if the required vehicle power is not less than the predetermined power level. Calculating a possible discharge amount of the battery if it is determined that discharging of the battery is possible. Determining if a difference between the required vehicle power and the predetermined power level is greater than the possible discharge amount of the battery. Setting the output current of the bi-directional DC/DC converter to allow for emission of energy corresponding to the possible discharge amount of the battery if the difference between the required vehicle power and the predetermined power level is greater than the possible discharge amount of the battery.

The method further includes setting the output current of the bi-directional DC/DC converter to allow for emission of energy corresponding to the difference between the required vehicle power and the predetermined power level if the difference between the required vehicle power and the predetermined power level is not greater than the possible discharge amount of the battery.

It is still preferable that setting the output current of the bi-directional DC/DC converter to zero, such that output or input of energy from or to the battery is not possible if discharging of the battery is not possible.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE INVENTION

Figure 1:
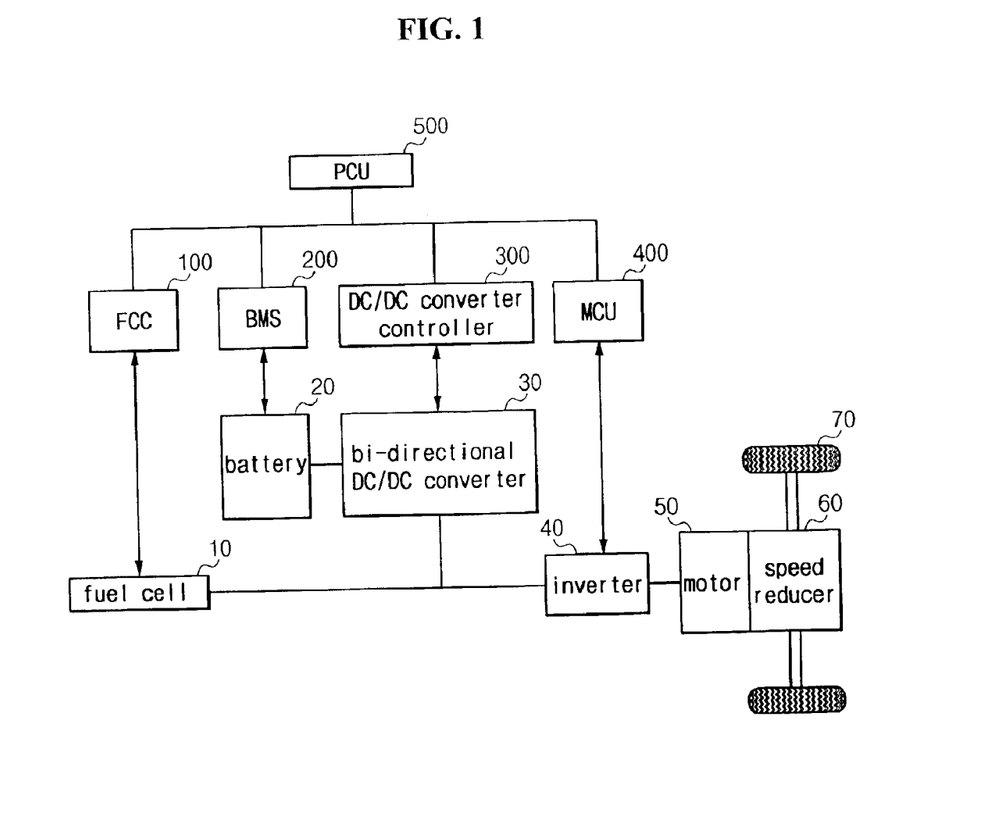
FIG. 1 is a schematic view of an embodiment of a power distribution control system and related elements according to an embodiment of the present invention.

Referring to FIG. 1, a power distribution system for a fuel cell hybrid electric vehicle includes a fuel cell 10, and a battery 20 used as an auxiliary power source. Also included is a bi-directional DC/DC converter 30 connected in parallel between the fuel cell 10 and the battery 20 that supplies a stable voltage to a motor 50, maintains a balance between different output voltages of the fuel cell 10 and the battery 20, and supplies any surplus voltage of the fuel cell 10 and a regeneration energy as a charge voltage of the battery 20. An inverter 40, electrically connected to the bi-directional DC/DC converter 30 and the fuel cell 10, is included to receive power, which the inverter 40 converts into AC power. The motor 50 then converts the AC power of the inverter 40 into rotational mechanical energy. A speed reducer 60 is also included that receives a rotational force of the motor 50 and transmits the same to wheels 70.

A system to control the above power distribution system for fuel cell hybrid electric vehicles includes a fuel cell controller (FCC) 100 for controlling operational states and an output of the fuel cell 10. Also included is a battery management system (BMS) 200 that performs surveillance of battery operations and manages a charge state of the battery 20. A DC/DC converter controller 300 is included for controlling an output voltage, a current, and a power of the bi-directional DC/DC converter 30. A motor control unit (MCU) 400 for controlling a torque applied to the motor 50 and a power control unit (PCU) 500, that is the master controller of the energy management system.

In a preferable embodiment the FCC 100, the BMS 200, the DC/DC converter controller 300, the MCU 400, and the PCU 500 realize signal communications using CAN (controller area network) communications. Since CAN communications is a type of serial communications commonly used in the control of vehicles, a detailed description thereof will not be provided.

The FCC 100 controls the supply of power of the fuel cell 10, which is the main power source in the fuel cell hybrid electric vehicle, to the motor 50. The BMS 200 controls the supply of power of the battery 20, which is the auxiliary power source, to the motor 50. The BMS 200 also controls the absorption of regeneration energy input from the motor 50 to the battery 20.

The DC/DC converter controller 300 performs controls of the DC/DC converter 30 so that the same performs an energy buffer function between the two types of energy sources of the fuel cell 10 and the battery 20. The DC/DC converter also acts to adjust a charging and discharging rate of the battery 20.

The MCU 400 controls power transmitted to the motor 50, and also acts to transmit regeneration energy to the battery 20 during braking.

The PCU 500 distributes outputs of the fuel cell 10 and the battery 20 to maximize power efficiency of the system while considering states of the fuel cell 10 and the battery 20. Furthermore, the PCU 500 estimates vehicle power requirements, battery charge and discharge requirements, fuel cell output amounts, and outputs bi-directional DC/DC output instructions to perform power distribution control of the hybrid electric vehicle. The PCU 500 also uses information of the amount of power used by the motor 50, and information of increased and decreased power, which is estimated utilizing variations in output values of an accelerator pedal and a brake pedal, and variations in vehicle speed. In addition, the PCU 500 determines a required charge amount and a possible discharge amount of the battery 20 using a present state of charge (SOC) controller of the battery 20. Still further, the PCU 500 compares an output amount in a drive range where the fuel cell 10 attains an optimal efficiency with vehicle power requirements calculated previously to determine a required discharge amount and a possible charge amount of the battery 20.

The PCU 500 controls the charge and discharge of the battery 20 through the above processes. In the case where the battery 20 is discharged, the PCU 500 compares the possible discharge amount of the battery and the battery required discharge amount calculated above and selects the one with the lower value as an output instruction of the bi-directional DC/DC converter 30. In the case where the battery 20 is charged, the PCU 500 compares the battery charge requirement and possible charge amount calculated previously, and selects the one with the lower value as an output instruction of the bi-directional DC/DC converter 30.

As described above, a power distribution mode is determined based on power requirements of the vehicle, and status of the fuel cell 10 and the battery 20. The different modes for the power distribution system of the present invention include a fuel cell only mode, a battery discharge mode, a battery charge mode, and a regeneration mode.

Figure 2:
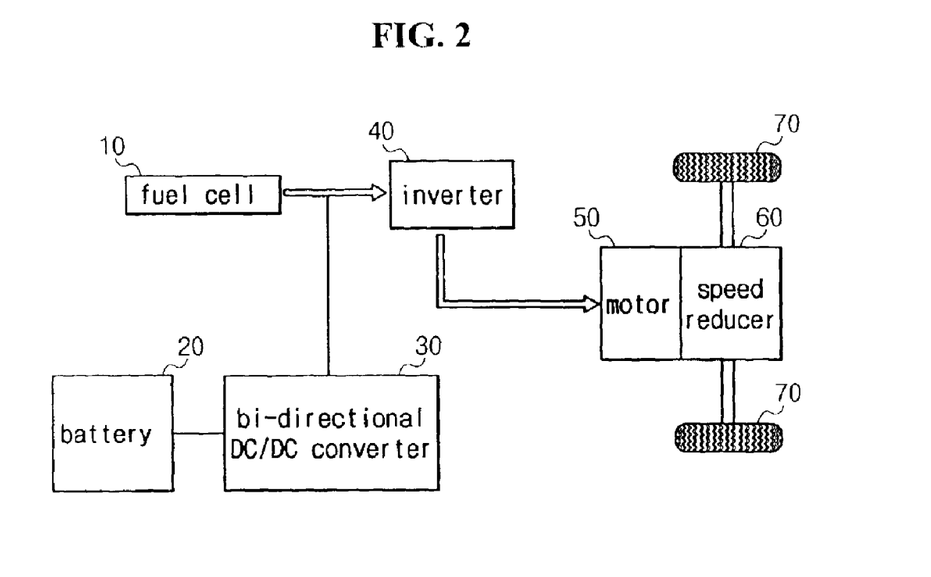
FIGS. 2 to 5 are partial views of the system of FIG. 1 showing different power distribution embodiments.

FIG. 2 is a partial view of the power distribution system showing the flow of energy when the system is in the fuel cell only mode. When in the fuel cell only mode, energy of the fuel cell 10 passes through the inverter 40 and is transmitted to the motor 50. The fuel cell only mode is selected when the required power of the vehicle is in an optimal drive range of the fuel cell 10, or when the battery 20 is in a good charged state. That is, the fuel cell only mode is selected when the required vehicle power $P_{req}$ is less than or equal to a fuel cell optimal power $P_{FC.opt}$ and the present SOC of the battery 20 is at a predetermined upper limit value. The upper limit value is a maximum charge value of the battery and is determined by the PCU 500 using BMS electric signals.

Charging and discharging of the battery 20 may cause a reduction in power efficiency of the system when in the fuel cell only mode, the required power of the vehicle is in the optimal efficiency drive range of the fuel cell 10, and the charge status of the battery is good. As a result, the fuel cell 10 fully supplies the required power of the vehicle when charging or discharging of the battery 20 does not take place.

Figure 3:
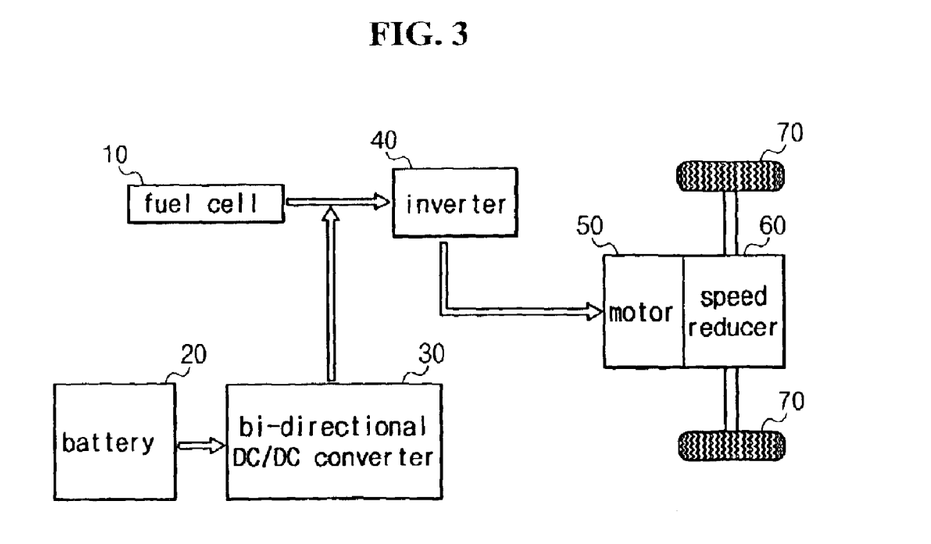

FIG. 3 is a partial view of the power distribution system showing the flow of energy when the system is in the battery discharge mode. When in the battery discharge mode, both the energy of the fuel cell 10 and that of the battery 20 are transmitted to the motor 50 after passing through the inverter 40.

The battery discharge mode is selected when the required power of the vehicle is no longer in the optimal drive range of the fuel cell 10, or when the battery 20 is in a good charge state. That is, the battery discharge mode is selected when the required vehicle power $P_{req}$ is greater than the fuel cell optimal power $P_{FC.opt}$, and the present SOC of the battery 20 is greater than or equal to a predetermined lower limit value. The lower limit value is a minimum value to which the battery 20 may be discharged, and is determined in the PCU 500 using BMS electric signals.

In the battery discharge mode, when the required power of the vehicle is outside the optimal efficiency drive range of the fuel cell 10, an amount of power corresponding to the amount outside the optimal drive range is supplied from the battery 20 through the bi-directional DC/DC converter 30. Accordingly, the fuel cell 10 operates in the optimal efficiency drive region and the power required by the vehicle is obtained.

Figure 4:
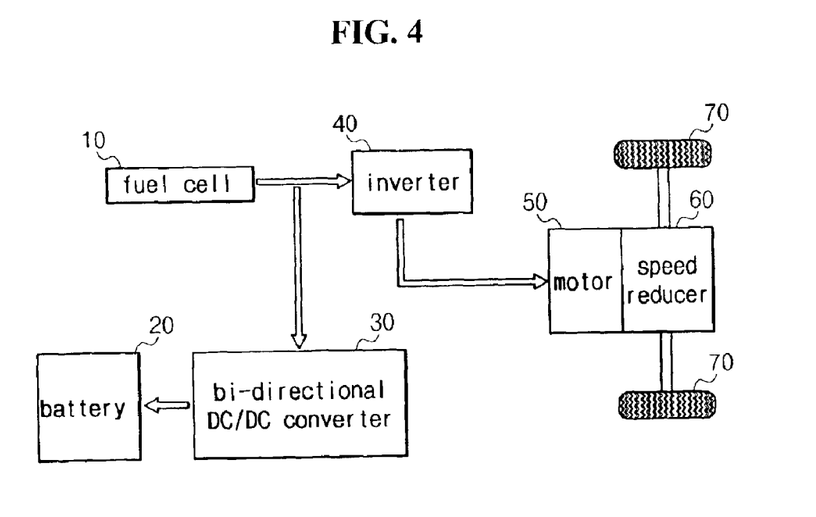

FIG. 4 is a partial view of the power distribution system showing the flow of energy when the system is in the battery charge mode. When in the battery charge mode, part of the energy of the fuel cell 10 is supplied to the battery 20 through the bi-directional DC/DC converter 30 to charge the battery 20.

The battery charge mode is selected when the required vehicle power $P_{req}$ is greater than zero and less than the fuel cell optimal power $P_{FC.opt}$, and the present SOC of the battery 20 is at the predetermined lower limit value. Since the required power of the vehicle is within the optimal drive range of the fuel cell 10, the required power of the vehicle is supplied while maintaining the optimal efficiency drive region of the fuel cell 10, and excess energy is supplied to the battery 20 via the bi-directional DC/DC converter 30 for charging the battery 20.

Figure 5:
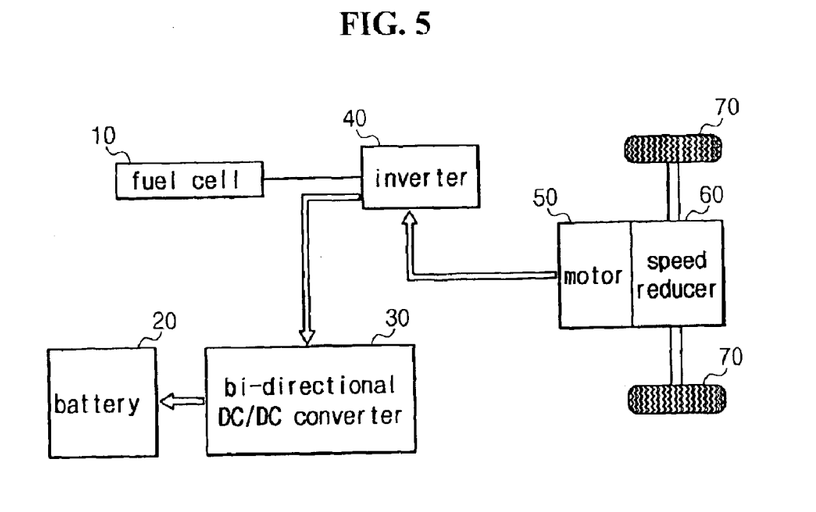

FIG. 5 is a partial view of the power distribution system showing the flow of energy when the system is in the regeneration mode. When in the regeneration mode, braking energy is restored to the power sources. The regeneration mode is selected when the vehicle is not requiring power, that is, when the required vehicle power $P_{req}$ is less than or equal to zero.

The motor 50, used as the drive source of the vehicle, is able to convert mechanical energy generated during braking into electrical energy, and restore the electrical energy to the power sources. Such restored energy charges the battery 20 by passing through the bi-directional DC/DC converter 30.

Figure 6:
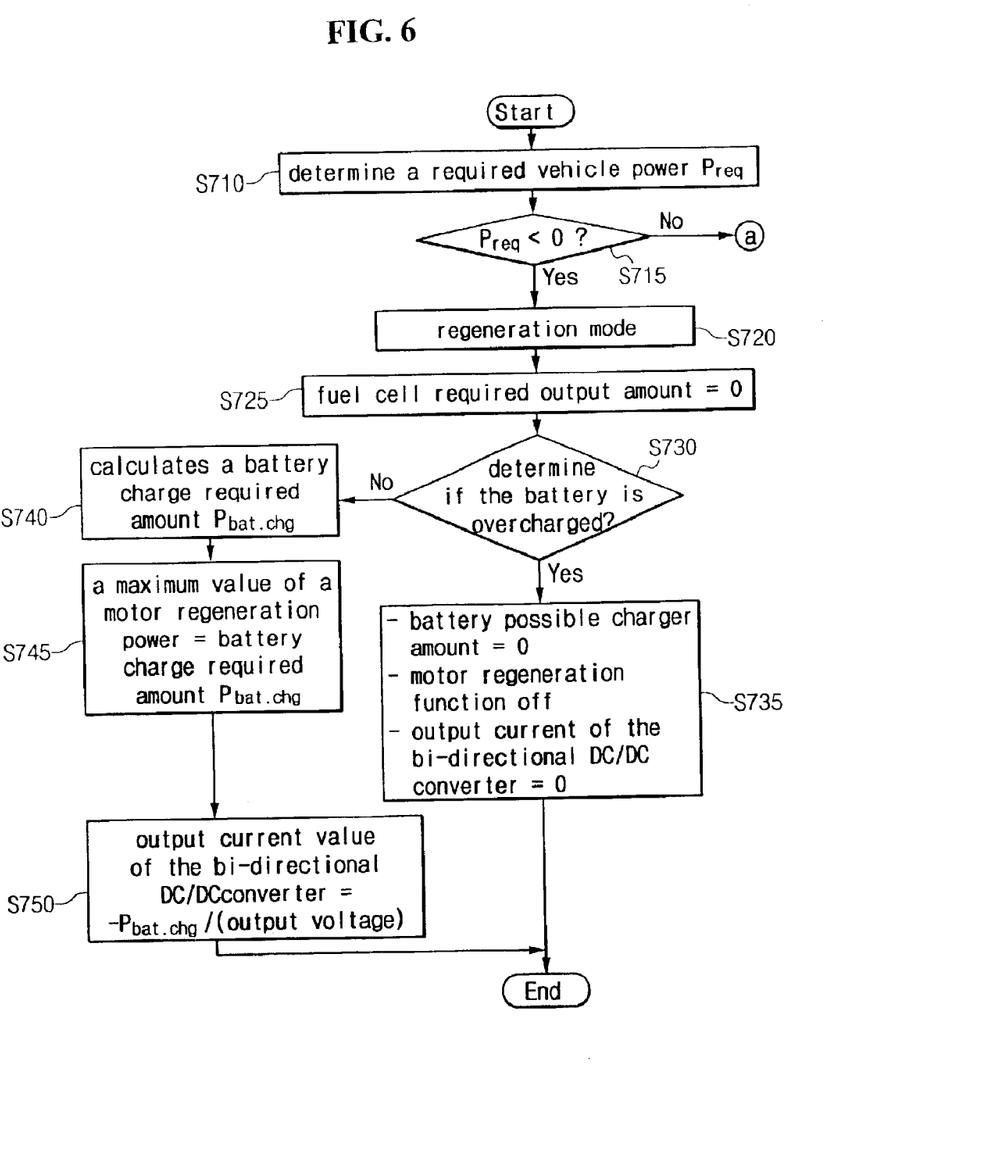
FIGS. 6 to 8 are flow charts of a power distribution control method for a fuel cell hybrid electric vehicle according to an embodiment of the present invention.

A power distribution control method for a fuel cell hybrid electric vehicle according to an embodiment of the present invention will now be described with reference to FIGS. 6 to 8.

First, the PCU 500 determines a required vehicle power $P_{req}$ in step S710. To do this, the PCU 500 monitors information of the amount of power presently used by the motor 50, estimates of increased or decreased power requirements based on variations in output values of an accelerator pedal and a brake pedal, and variations in vehicle speed. Since depression (or increased depression) of the accelerator pedal indicates a desire by the driver to increase speed, an increase in the power used in the engine is therefore required. It is preferable that the required power is increased in direct proportion to the amount by which the accelerator pedal is depressed. Further, depression (or increased depression) of the brake pedal indicates a desire by the driver to decelerate or stop, and a reduction in the power used in the engine is required in this case. Therefore, it is preferable that the required power is decreased.

The PCU 500 also determines if the required vehicle power $P_{req}$ is less than zero in step S715. If the required vehicle power $P_{req}$ is less than zero, the PCU 500 determines that the power distribution mode is in the regeneration mode in step S720. That is, it is determined that no energy output is necessary from the fuel cell 10 or the battery 20 since there is presently no power required by the driver.

The PCU 500 then establishes the fuel cell required output amount to be zero in step S725. Next, the PCU 500 determines if the battery 20 is overcharged in step S730. Overcharging occurs when a charge level of the battery 20 is greater than or equal to a predetermined upper limit value. If the battery 20 is overcharged, no further charging of the battery 20 is needed. If it is determined that the battery 20 is overcharged in step S730, the PCU 500 sets the battery possible charge amount to zero, switches the motor regeneration function to Off, and sets the output current of the bi-directional DC/DC converter 300 to zero in step S735.

If the PCU 500 determines that the battery 20 is not overcharged in step S730, the PCU 500 calculates an amount of charge required by the battery, or $P_{bat.chg}$, in step S740. Then the PCU 500 sets a maximum value of a motor regeneration power as this battery charge required amount $P_{bat.chg}$ in step S745. Subsequently, the PCU 500 sets an output current value of the bi-directional DC/DC converter 30 to the ratio of $-P_{bat.chg}$/output voltage in step S750. That is, the output current of the bi-directional DC/DC converter 30 is set such that energy corresponding to the battery charge required amount $P_{bat.chg}$ is charged to the battery 20.

Therefore, the battery 20 is charged using regenerated energy derived from braking.

Figure 7:
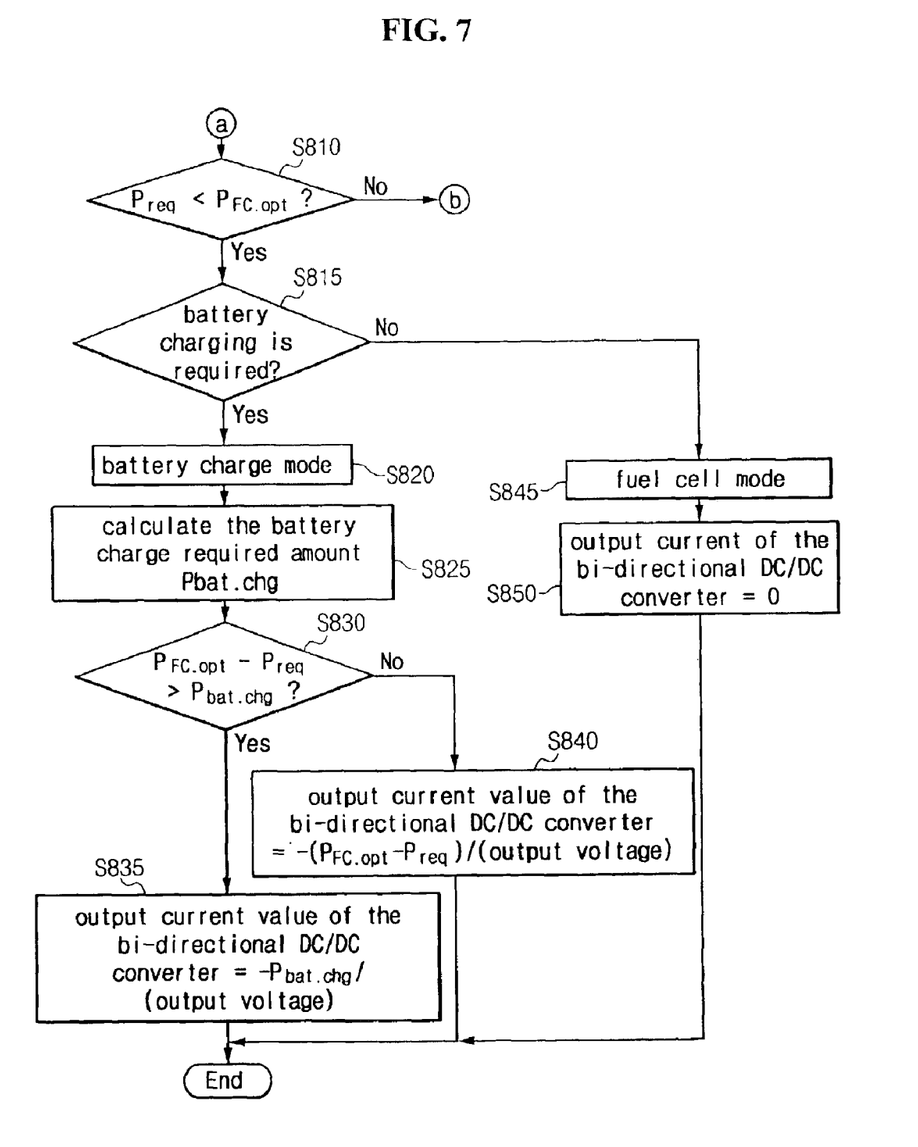

In step S715, if it is determined that the required vehicle power $P_{req}$ is not less than zero, the PCU 500 then determines if the required vehicle power $P_{req}$ is less than a predetermined value $P_{FC.opt}$ in step S810, FIG. 7. The predetermined value $P_{FC.opt}$ is an upper limit of an optimal power range of the fuel cell 10. Therefore, in step S810, it is determined whether the required vehicle power $P_{req}$ is within a high efficiency operation range of the fuel cell 10. If the required vehicle power $P_{req}$ is less than the predetermined value $P_{FC.opt}$ it is then determined if the battery 20 requires charging in step S815.

If the battery requires charging, the PCU 500 determines that the present power distribution mode is the battery charge mode in step S820, after which the PCU 500 calculates the battery charge required amount $P_{bat.chg}$ in step S825.

Subsequently, the PCU 500 determines if a difference between the predetermined value $P_{FC.opt}$ and the required vehicle power $P_{req}$ is greater than the battery charge required amount $P_{bat.chg}$ in step S830. If the difference between the predetermined value $P_{FC.opt}$ and the required vehicle power $P_{req}$ is greater than the battery charge required amount $P_{bat.chg}$, the PCU 500 sets the output current value of the bi-directional DC/DC converter 30 to the ratio of $-P_{pat.chg}$/output voltage in step S835. However, if the difference between the predetermined value $P_{FC.opt}$ and the required vehicle power $P_{req}$ is not greater than the battery charge required amount $P_{bat.chg}$, the PCU 500 sets the output current value of the bi-directional DC/DC converter 30 to the ratio of $-(P_{FC.opt}-P_{req})$/output voltage in step S840.

Where the difference between the calculated value $P_{FC.opt}$ and the required vehicle power $P_{req}$ is greater than the amount required for charging the battery $P_{bat.chg}$, the output current value of the bi-directional DC/DC converter 30 is set such that the battery 20 is charged by an amount equal to the battery charge required amount $P_{bat.chg}$.

However, where the difference between the predetermined calculated value $P_{FC.opt}$ and the required vehicle power $P_{req}$ is not greater than the battery charge required amount $P_{bat.chg}$, the output current value of the bi-directional DC/DC converter 30 is set such that the battery 20 is charged using the energy of the fuel cell 10 that is within the optimal operating range of the same, and not by an amount equal to the calculated battery charge required amount $P_{bat.chg}$.

If the battery 20 does not require charging in step S815, the PCU 500 determines that the present power distribution mode is the fuel cell only mode in step S845. The PCU 500 then sets the output current of the bi-directional DC/DC converter 30 to zero in step S850.

Figure 8:
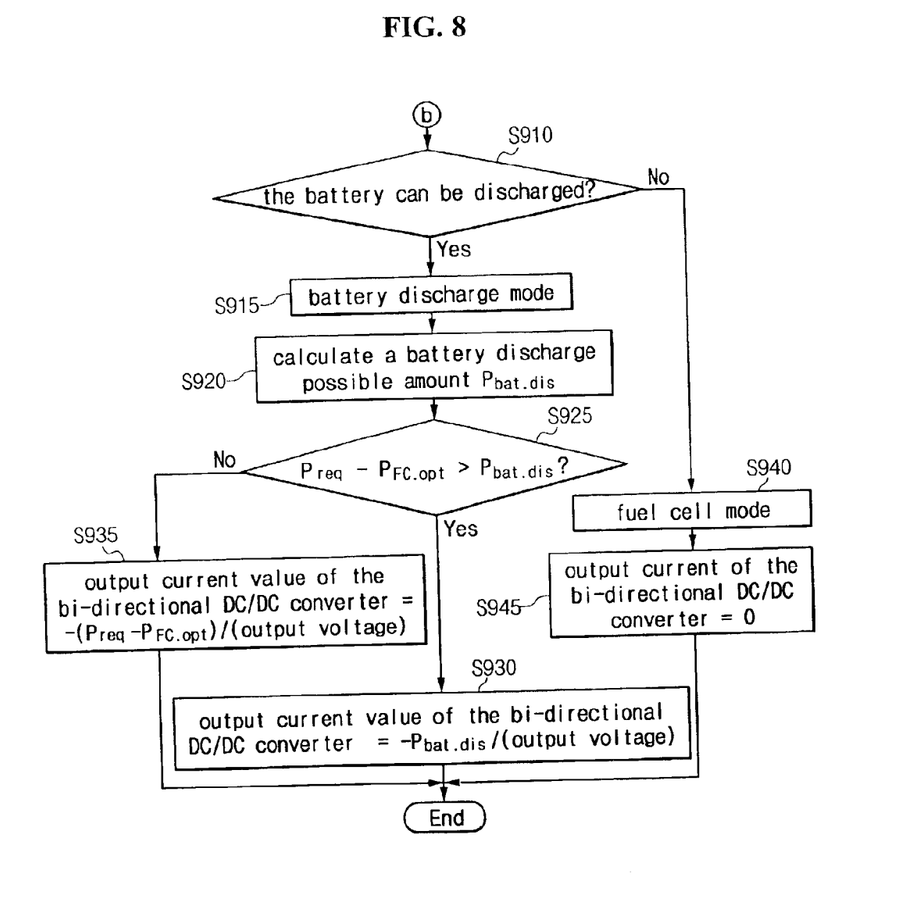

In step S810, if the required vehicle power $P_{req}$ is greater than the predetermined value $P_{FC.opt}$ the PCU 500 determines if the battery 20 can be discharged in step S910, FIG. 8. Here, if the charge level of the battery 20 is greater than or equal to a predetermined lower limit value, then discharging of the battery 20 is possible.

If it is possible to discharge the battery 20, the PCU 500 determines that the present power distribution mode is the battery discharge mode in step S915. The PCU 500 then calculates a battery discharge amount $P_{bat.dis}$ in step S920

Next, the PCU 500 determines if the difference between the required vehicle power $P_{req}$ and the predetermined value $P_{FC.opt}$ is greater than the battery discharge required amount $P_{bat.dis}$ in step S925. If the difference between the required vehicle power $P_{req}$ and the predetermined value $P_{FC.opt}$ is greater than the battery discharge required amount $P_{bat.dis}$, the PCU 500 sets the output current value of the bi-directional DC/DC converter 30 to the ratio of $-P_{bat.dis}$/output voltage in step S930. That is, part of the required vehicle power surpassing a predetermined power value is set to be output from the battery 20. At this time, not all the required amount is output from the battery 20. Instead, an amount equal to the possible battery discharge amount is output such that insufficient output by the fuel cell 10 is compensated by battery discharge. Therefore, excessive discharging of the battery 20 is prevented.

In step S925, if the difference between the required vehicle power $P_{req}$ and the predetermined value $P_{FC.opt}$ is not greater than the battery discharge required amount $P_{bat.dis}$, the PCU 500 sets the output current value of the bi-directional DC/DC converter 30 to the ratio of $-(P_{req}-P_{FC.opt})$/output voltage in step S935. Therefore, the fuel cell 10 is made to operate in the optimal operational range and the required insufficient power is supplemented by the battery.

In step S910, if the battery 20 is not able to be discharged, the PCU 500 determines that the present power distribution mode is the fuel cell only mode in step S940. The PCU 500 then sets the output current of the bi-directional DC/DC converter 30 to zero in step S945. Accordingly, even if the required vehicle power $P_{req}$ is not within the range of the optimal operating condition of the fuel cell 10, since the battery 20 is not able to discharge, power of the fuel cell 10 cannot be supplemented.

Although preferred embodiments of the present invention have been described it should be clearly understood that many variations and/or modifications of the basic inventive concepts herein taught which may appear to those skilled in the present art will still fall within the spirit and scope of the present invention, as defined in the appended claims.

What is claimed is:

1. A system for controlling power distribution of a fuel cell hybrid electric vehicle, comprising:
    a fuel cell used as a main power source;
    a battery used as an auxiliary power source;
    a bi-directional DC/DC converter connected to the battery to allow for the input of power to and output from the battery;
    an inverter electrically connected to the bi-directional DC/DC converter and the fuel cell;
    a motor connected to the inverter and which converts electrical energy into rotational mechanical energy for driving the vehicle; and
    a controller for estimating a required vehicle power and controlling power transmission between the fuel cell, the battery, the bi-directional DC/DC converter, and the inverter based on the estimated required vehicle power and states of the fuel cell and of the battery;
    wherein the controller, according to a present required vehicle power and a battery charge state, selectively performs control into one of a plurality of modes including:
        a fuel cell mode, in which the energy of the fuel cell is transmitted through the inverter to drive the motor;
        a battery discharge mode, in which energies of the fuel cell and the battery are simultaneously transmitted through the inverter to drive the motor;
        a battery charge mode, in which part of the energy output from the fuel cell is transmitted through the inverter to drive the motor, and another part of the energy output from the fuel cell is transmitted through the bi-directional DC/DC converter to charge the battery; and
        a regeneration mode, in which restored braking energy is transmitted through the bi-directional DC/DC converter to charge the battery.

2. The system of claim 1, wherein the fuel cell mode is implemented when the required vehicle power is less than a predetermined power, and a charge degree of the battery is greater than or equal to an upper limit value.

3. The system of claim 1, wherein the required vehicle power is estimated based on a power presently used in the motor, a level of depression of an accelerator pedal, and a level of depression of a brake pedal.

4. The system of claim 1, wherein the battery discharge mode is implemented when the required vehicle power is greater than a predetermined level of power, and an amount of charge of the battery is greater than or equal to a predetermined lower limit value.

5. The system of claim 1, wherein the battery charge mode is implemented when the required vehicle power is less than or equal to a predetermined level of power, and an amount of charge of the battery is less than an upper limit value.

6. The system of claim 1, wherein the regeneration mode is selected when the required vehicle power is less than zero.

7. A method for controlling power distribution of a fuel cell hybrid electric vehicle that uses a power distribution system, the system including a fuel cell used as a main power source, a battery used as an auxiliary power source, a bi-directional DC/DC converter electrically connected to the battery and the fuel cell, and a controller that controls power transmission between the fuel cell, the battery, and the bi-directional DC/DC converter, the method comprising:
    estimating a required vehicle power in a present state;
    determining if the required vehicle power indicates a regenerative state;
    setting a fuel cell required output amount to zero if the required vehicle power indicates a regenerative state;
    establishing an output current of the bi-directional DC/DC converter such that the battery may be charged based on a charge state of the battery;
    determining if the battery is overcharged;
    estimating a battery charge required amount if the battery is not overcharged;
    establishing a regeneration energy maximum value of a motor as the battery charge required amount; and
    establishing an output current of the bi-directional DC/DC converter to allow for the charge of the battery by an amount equal to the calculated battery charge required amount.

8. The method of claim 7, wherein charging of the battery further comprises:
    controlling to Off a regeneration function of the motor if the battery is overcharged; and
    setting the output current of the bi-directional DC/DC converter to zero.

9. A method for controlling power distribution of a fuel cell hybrid electric vehicle that uses a power distribution system, the system including a fuel cell used as a main power source, a battery used as an auxiliary power source, a bi-directional DC/DC converter electrically connected to the battery and the fuel cell, and a controller that controls power transmission between the fuel cell, the battery and the bi-directional DC/DC converter, the method comprising:
    estimating a required vehicle power in a present state;
    determining if the required vehicle power indicates a regenerative state;
    setting a fuel cell required output amount to zero if the required vehicle power indicates a regenerative state;
    establishing an output current of the bi-directional DC/DC converter such that the battery may be charged based on a charge state of the battery;
    determining if the required vehicle power is less than a predetermined power level if the estimated required vehicle power is not in the regenerative state;
    determining that the battery requires charging if the required vehicle power is less than the predetermined power level; and
    calculating a battery charge required amount and performing control to charge the battery according to the calculated battery charge required amount.

10. The method of claim 9, wherein the charging of the battery comprises:
    calculating the battery charge required amount based on a present battery charge state;

determining if a difference between the predetermined power level and the required vehicle power is greater than the battery charge required amount; and establishing the output current of the bi-directional DC/DC converter such that the battery may be charged by the calculated charge required amount if the difference between the predetermined power level and the required vehicle power is greater than the battery charge required amount.

11. The method of claim 10, wherein the output current of the bi-directional DC/DC converter is established such that energy corresponding to the difference between the predetermined power and the required vehicle power is stored in the battery in the case where the difference between the predetermined power level and the required vehicle power is not greater than the battery charge required amount.

12. The method of claim 9, wherein the output current of the bi-directional DC/DC converter is set to zero such that the battery is not charged in the case where charging of the battery is not required.

13. The method of claim 9, further comprising:

determining that discharging of the battery is possible if the required vehicle power is not less than the predetermined power level;

calculating a possible discharge amount of the battery if it is determined that discharging of the battery is possible;

determining if a difference between the required vehicle power and the predetermined power level is greater than the possible discharge amount of the battery; and setting the output current of the bi-directional DC/DC converter to allow for release of energy corresponding to the possible discharge amount of the battery if the difference between the required vehicle power and the predetermined power level is greater than the possible discharge amount of the battery.

14. The method of claim 13, further comprising setting the output current of the bi-directional DC/DC converter to allow for the release of energy corresponding to the difference between the required vehicle power and the predetermined power level if the difference between the required vehicle power and the predetermined power level is not greater than the possible discharge amount of the battery.

15. The method of claim 13, wherein in the setting the output current of the bi-directional DC/DC converter, if the difference between the required vehicle power and the predetermined power level is not greater than the possible discharge amount of the battery, the output current of the bi-directional DC/DC converter is set to zero such that output or input of energy from or to the batter does not occur.

* * * * *